(12) United States Patent
Wang

(10) Patent No.: US 7,475,897 B2
(45) Date of Patent: Jan. 13, 2009

(54) MOTORCYCLE ENGINE GUARD

(76) Inventor: Gwo-Tsair Wang, 2919 Canyonview Ct., Katy, TX (US) 77450

( * ) Notice: Subject to any disclaimer, the term of this patent is extended or adjusted under 35 U.S.C. 154(b) by 160 days.

(21) Appl. No.: 11/499,990

(22) Filed: Aug. 7, 2006

(65) Prior Publication Data

US 2008/0029325 A1    Feb. 7, 2008

(51) Int. Cl.
*B62K 11/00* (2006.01)
(52) U.S. Cl. ............... 280/291; 180/219; 280/304.3
(58) Field of Classification Search ........... 180/219; 280/291, 304.3
See application file for complete search history.

(56) References Cited

U.S. PATENT DOCUMENTS

| | | | |
|---|---|---|---|
| 4,030,561 A | 6/1977 | Hashimoto | |
| 4,171,823 A | 10/1979 | Nemes | |
| 4,456,090 A | 6/1984 | Malenotti | |
| 4,925,231 A | 5/1990 | Hamaguchi | |
| D361,311 S | 8/1995 | Lindby | |
| 5,524,918 A * | 6/1996 | Peabody et al. | 280/291 |
| D396,018 S | 7/1998 | Stover et al. | |
| 5,997,023 A * | 12/1999 | Sauter | 280/291 |
| 6,035,876 A | 3/2000 | Stover et al. | |
| 6,173,983 B1 | 1/2001 | Moore | |
| 6,354,723 B1 | 3/2002 | Spence | |
| D474,847 S | 5/2003 | Seymour et al. | |
| D476,093 S | 6/2003 | Lynch et al. | |
| D484,074 S | 12/2003 | Henneberry | |
| 6,969,083 B2 | 11/2005 | Egan | |
| 6,971,462 B2 | 12/2005 | Ito et al. | |
| D513,719 S | 1/2006 | Egan | |
| 6,981,713 B2 | 1/2006 | Lindby | |
| 7,025,368 B2 | 4/2006 | Barnes | |
| D521,416 S | 5/2006 | Lindby | |
| D522,929 S | 6/2006 | Freund, Jr. | |
| 7,073,808 B2 | 7/2006 | Egan | |
| 7,083,181 B2 * | 8/2006 | Lindby | 280/291 |
| 7,404,568 B1 * | 7/2008 | Portelance et al. | 280/291 |
| 7,431,118 B1 * | 10/2008 | Hogg | 180/219 |
| 2002/0158441 A1 | 10/2002 | Essinger | |

FOREIGN PATENT DOCUMENTS

DE    19511760    10/1996

* cited by examiner

*Primary Examiner*—Paul N Dickson
*Assistant Examiner*—Patrick Centolanzi
(74) *Attorney, Agent, or Firm*—Clarence E. Eriksen

(57) ABSTRACT

A motorcycle engine guard is disclosed which comprises a bar that surrounds the engine of the motorcycle. The bar has a first side that extends from the bottom of the engine on one side of the engine to the top of the engine and the second side that extends from the bottom of the opposite side of the engine to the top of the engine. A spring-loaded footrest is disposed in each side of the bar and the spring-loaded footrest has a retracted position when not in use and a deployed position when in use.

3 Claims, 3 Drawing Sheets

MOTORCYCLE ENGINE GUARD

BACKGROUND OF THE INVENTION

1. Field of the Invention

The present invention relates motorcycle accessories, and more particularly to an engine guard with spring-loaded footrests.

2. Description of the Prior Art

The engine on a motorcycle is usually located toward the front of the vehicle, i.e., behind the front wheel struts and forward of the seat. Motorcycle engines are typically uncovered along the sides, and therefore exposed to possible damage. Most manufacturers provide a bar or other guard to lessen the risk of damage, but such bars or guards are not attractive, are inconvenient for the placement of the rider's legs and feet, and are placed or shaped in such a way as to fail to adequately protect against damage from the side.

Several types of footrests for motorcycle operators and passengers have been proposed, and these footrests have been added to various places on motorcycles. Examples of such footrests are disclosed in U.S. Pat. No. 7,073,808 to Egan (disclosing a motorcycle footrest that pivots from a stowed to a deployed position); U.S. Pat. No. 6,981,713 to Lindby (also disclosing a motorcycle footrest that pivots from a stowed to a deployed position); U.S. Pat. No. 6,354,723 to Spence (describing a motorcycle footrest with a light inside); U.S. Pat. No. 6,173,983 to Moore (displaying a set of otherwise conventional motorcycle footrests that have unusual mounting brackets); U.S. Pat. No. 4,456,090 to Malenotti (adjustable motorcycle footrest); U.S. Pat. No. 4,171,823 to Nemes (a motorcycle locking bar that doubles as a footrest); U.S. Pat. No. 4,030,561 to Hashimoto and Shako (a motorcycle footrest that pivots); Published Patent Application No. US2002/0158441 (a dual eccentric adjustable motorcycle footrest); and German patent DE 19511760 (an adjustable cantilevered footrest useable by a passenger on a motorcycle).

A common disadvantage of prior art footrests on a motorcycle engine guard is that the operator of the motorcycle must manually move the footrests from a retracted position to a deployed position. As a result, movement of the footrests to a deployed position while riding the motorcycle results in the operator's attention being diverted from his/her operation of the motorcycle.

SUMMARY OF THE INVENTION

In accordance with the present invention, a motorcycle engine guard is provided which, when installed, protrudes from each side of a motorcycle in front of the engine and behind the front wheel strut. While a motorcycle engine guard according to the present invention is designed not to bend or collapse and to protect each side of the cycle engine, a motorcycle engine guard according to the present invention also comprises a footrest on each side of the guard which is spring-loaded and which may therefore be deployed by the operator without diverting his/her attention from operation of the motorcycle.

DESCRIPTION OF SPECIFIC EMBODIMENTS

It will be appreciated that the present invention may take many forms and embodiments. In the following description, some embodiments of the invention are described and numerous details are set forth to provide an understanding of the present invention. Those skilled in the art will appreciate, however, that the present invention practiced without those details and that numerous variations from and modifications of the described embodiments may be possible. The following description is thus intended to illustrate and not to limit the present invention.

Figure 2:
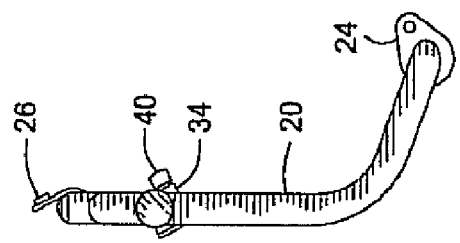
FIG. 2 is a side view of the embodiment of the motorcycle engine guard shown in FIG. 1.
Figure 3:
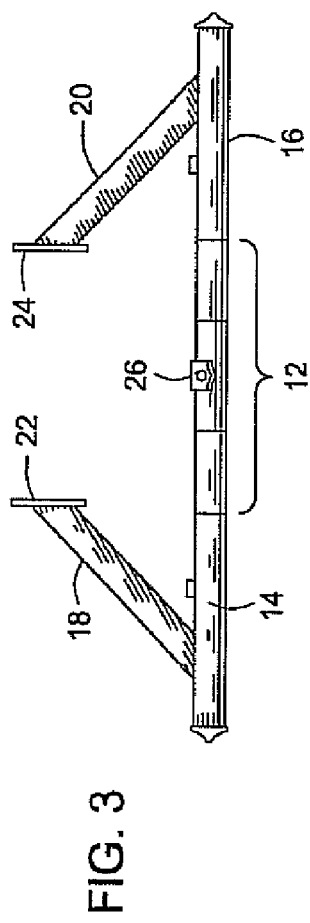
FIG. 3 is a top view of the embodiment of the motorcycle engine guard shown in FIG. 1.
Figure 1:
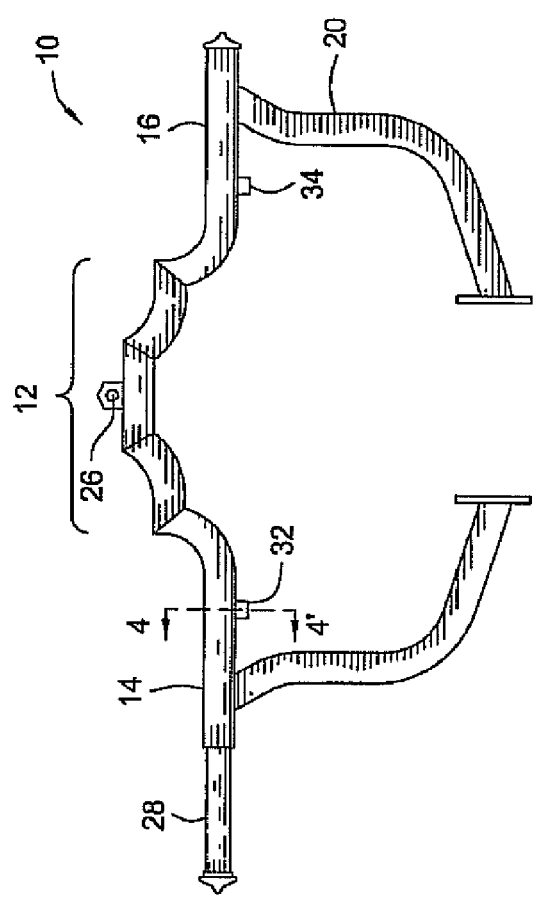
FIG. 1 is a front elevation view of one embodiment of a motorcycle engine guard in accordance with the present invention.

With reference first to FIGS. 1-3, an embodiment of a motorcycle engine guard 10 according to the present invention is illustrated. Motorcycle engine guard 10 comprises a central section 12 having generally ornate shape. Central section 12 is connected to curved pieces 14 and 16 on each side of motorcycle engine guard 10. Such connection may, for example, be made by welding. Attached to each of the curved pieces 14 and 16 are two additional curved pieces 18 and 20, respectively. Curved pieces 14 and 16 may be welded to curved pieces 18 and 20, with curved pieces 18 and 20 being in a generally vertical position and with the curved sections thereof facing in the direction as shown in FIGS. 2-3.

With reference still to FIGS. 1-2, motorcycle engine guard 10 in accordance with the present invention further comprises a spring-loaded footrest 28 which is installed inside curved piece 14 and a spring-loaded footrest 30 which is installed inside curved piece 16. A release mechanism 32 is associated with footrest 28 and a release mechanism 34 is associated with footrest 30. Release mechanisms 32 and 34 function to hold footrests 28 and 30, respectively, in retracted positions. In FIG. 1, footrest 30 is illustrated in its retracted position. When release mechanisms 32 and 34 are activated, the footrests 28 and 30, respectively, may move to their deployed positions. In FIG. 1, footrest 28 is illustrated in its deployed position.

Figure 4:
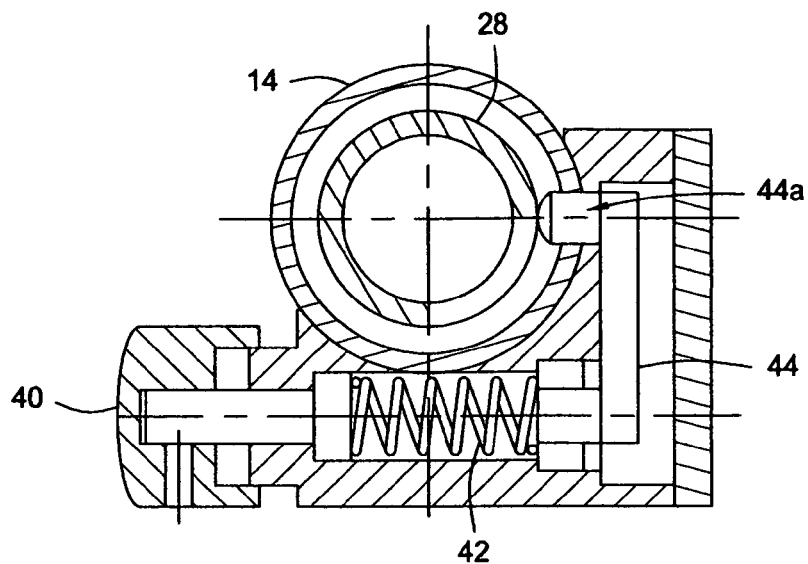
FIG. 4 is a cross-sectional view of release mechanism 32 taken along line 4-4' of FIG. 1.

With reference to FIG. 4, each release mechanism 32, 34 includes a plunger 40 which is held in the position shown in FIG. 4 by compression spring 42. In that position, end 44a of locking bar 44 engages a groove in each footrest 28, 30 to hold the footrest in a retracted position. When the plunger 40 is depressed, end 44a of locking bar 44 is disengaged from the footrest and the footrest moves from its retracted position inside curved piece 16 to an extended position.

Figure 5:
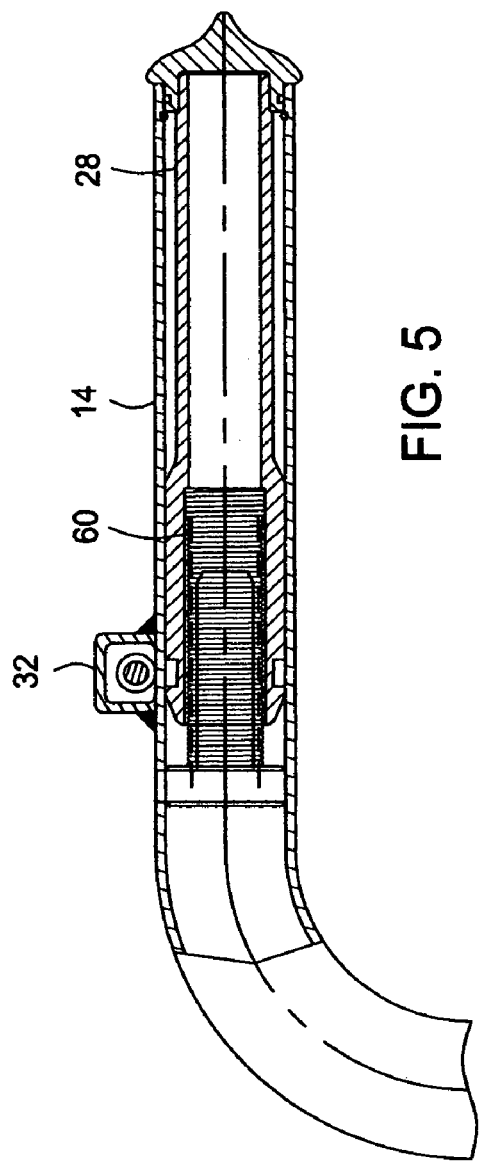
FIG. 5 is a cross-sectional view taken along the longitudinal axis of curve piece 14 in FIG. 1 which illustrated the footrest in the retracted position.
Figure 6:
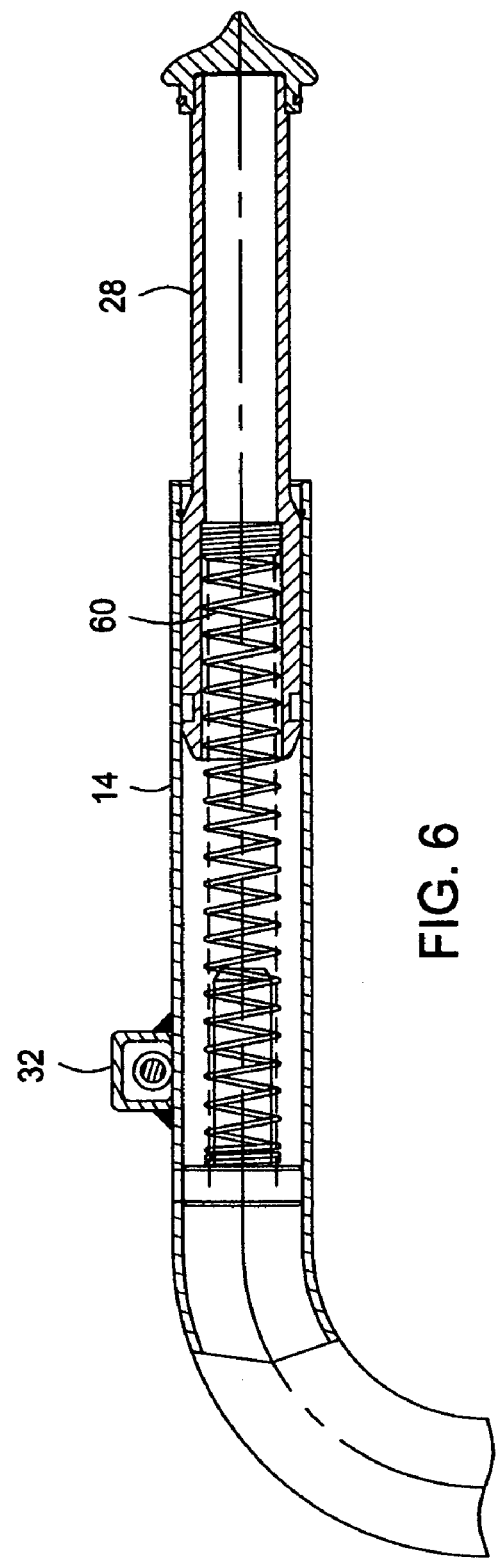
FIG. 6 is a cross-sectional view taken along the longitudinal axis of curve piece 14 in FIG. 1 which illustrated the footrest in the deployed position.

Referring to FIGS. 5 and 6, each spring-loaded footrest assembly 60 includes a footrest (28 or 30), a compression spring 62 and a shaft 64. Compression spring 60 is held in its compressed state shown in FIG. 5 by the release mechanism 32, 34 as discussed with respect to FIG. 4. When release mechanisms 32 and 24 are activated, compression spring 60 forces each footrest 28 and 30 into its deployed position as shown in FIG. 6.

Figure 7:
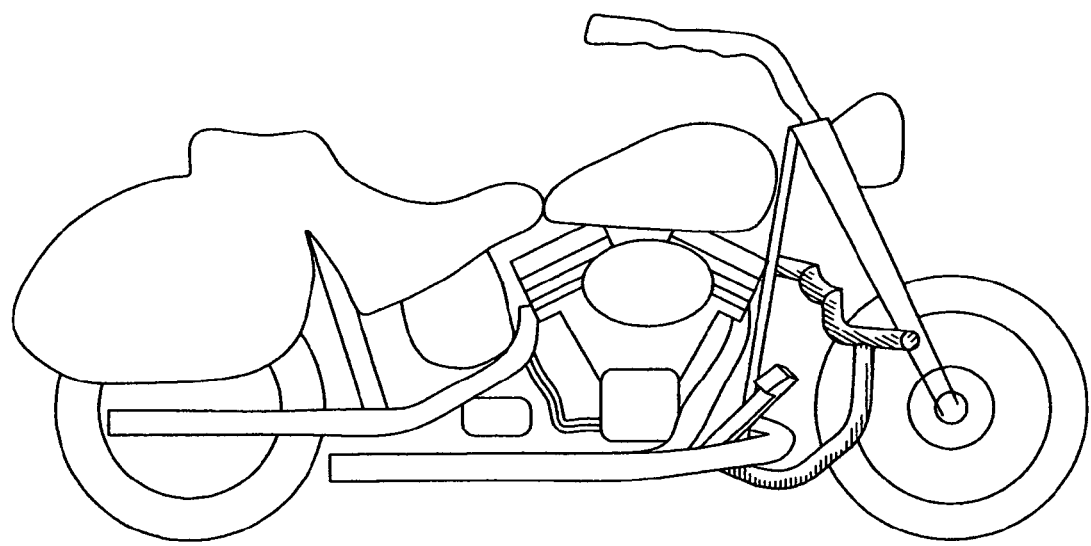
FIG. 7 is a perspective view of a motorcycle on which is installed a motorcycle engine guard of the present invention.

With reference now to FIG. 7, there is illustrated a motorcycle 40 containing a motorcycle engine guard 10 in accordance with the present invention. Motorcycle engine guard 10 (FIG. 1) also comprises brackets 22 and 24 for attachment of the motorcycle engine guard to the frame of a motorcycle near the lower part of the engine. Motorcycle engine guard 10 further comprises bracket 26 for attachment of the engine guard to the motorcycle frame near the top of the engine.

What is claimed is:

1. A motorcycle having a motorcycle engine guard which comprises:
   a bar which surrounds the engine of the motorcycle, the bar having a first side that extends from the bottom of the engine on one side of the engine to the top of the engine and a second side that extends from the bottom of the opposite side of the engine to the top of the engine;
   a first spring-loaded footrest including a first spring that is disposed in the first side of the bar in a telescoping manner, the first spring-loaded footrest having a retracted position inside the bar when not in use and a deployed position outside the bar when in use;
   a first release mechanism which holds the first footrest in the refracted position and which, when activated, allows the first spring to move the first footrest from the retracted position to the deployed position;
   a second spring-loaded footrest including a second spring which is disposed in the second side of the bar in a telescoping manner, the second spring-loaded footrest having a refracted position inside the bar when not in use and a deployed position outside the bar when in use; and
   a second release mechanism which holds the second footrest in the retracted position and which when activated, allows the second spring to move the second footrest from the retracted position to the deployed position.

2. A motorcycle engine guard comprising: a bar which surrounds the engine of the motorcycle, the bar having a first side that extends from the bottom of the engine on one side of the engine to the top of the engine and a second side that extends from the bottom of the opposite side of the engine to the top of the engine; a first spring-loaded footrest which is disposed in the first side of the bar in a telescoping manner and which comprises a first spring, the first spring-loaded footrest having a retracted position inside the bar when not in use and a deployed position outside the bar when in use; and a first release mechanism which functions to retain the first footrest in the retracted position and which, when activated, functions to allow the first spring to move the first footrest from the retracted position to the deployed position.

3. The motorcycle engine guard of claim 2, further comprising a second spring-loaded footrest which is disposed in the second side of the bar in a telescoping manner and which comprises a second spring, the second spring-loaded footrest having a retracted position inside the bar when not in use and a deployed position outside the bar when in use; and a second release mechanism which functions to retain the second footrest in the retracted position and which, when activated, functions to allow the second spring to move the second footrest from the retracted position to the deployed position.

* * * * *